(12) United States Patent
Agarwal

(10) Patent No.: US 7,680,746 B2
(45) Date of Patent: Mar. 16, 2010

(54) PREDICTION OF CLICK THROUGH RATES USING HYBRID KALMAN FILTER-TREE STRUCTURED MARKOV MODEL CLASSIFIERS

(75) Inventor: Deepak Agarwal, San Jose, CA (US)

(73) Assignee: Yahoo! Inc., Sunnyvale, CA (US)

(*) Notice: Subject to any disclaimer, the term of this patent is extended or adjusted under 35 U.S.C. 154(b) by 513 days.

(21) Appl. No.: 11/752,871

(22) Filed: May 23, 2007

(65) Prior Publication Data
US 2008/0294577 A1    Nov. 27, 2008

(51) Int. Cl.
*G06N 5/00*    (2006.01)
(52) U.S. Cl. .................................... 706/12; 706/45
(58) Field of Classification Search ............... 706/45, 706/12
See application file for complete search history.

(56) References Cited

OTHER PUBLICATIONS

Agarwal et al, Estimating Rates of Rare Events at Multiple Resolutions, Proceedings of the 13th ACM SIGKDD international conference on Knowledge discovery and data mining, Aug. 2007, pp. 16 to 25.*

* cited by examiner

*Primary Examiner*—Wilbert L Starks, Jr.
(74) *Attorney, Agent, or Firm*—Stattler - Suh PC

(57) ABSTRACT

Methods for predicting the click-through rates of Internet advertisements placed into web pages are disclosed. Specifically, a click-through rate prediction is generating using a hybrid system with two terms. The first term is constructed using a machine learning model that incorporates a limited number of important factors. The second term is constructed using a look-up table that is built using a complex statistical analysis of various web page and advertisement combinations. To construct the second term, the field of multi-level hierarchical modeling is used. Specifically, a tree-structured Markov model is used to process the training data and construct the adjustment factor look-up table. To reduce the complexity of the statistical analysis, Kalman-filters are used to estimate parameters in the traditional multi-level hierarchical models for scalability.

13 Claims, 3 Drawing Sheets

PREDICTION OF CLICK THROUGH RATES USING HYBRID KALMAN FILTER-TREE STRUCTURED MARKOV MODEL CLASSIFIERS

FIELD OF THE INVENTION

The present invention relates to the field of estimation of events having rare occurrence rates using established taxonomies. In particular the present invention discloses techniques for analyzing historical click-rate information with reference to a categorization system in order to predict the click-through rates for various internet advertisements.

BACKGROUND OF THE INVENTION

The global Internet has become a mass media on par with radio and television. And just like radio and television content, the content on the Internet is largely supported by advertising dollars. The main advertising supported portion of the Internet is the "World Wide Web" that displays Hypertext Mark-Up language (HTML) documents distributed using the Hypertext Transport Protocol (HTTP).

Two of the most common types of advertisements on the World Wide Web portion of the Internet are banner advertisements and text link advertisements. Banner advertisements are generally images or animations that are displayed within an Internet web page. Text link advertisements are generally short segments of text that are linked to the advertiser's web site.

With any advertising-supported business model, there needs to be some metrics for assigning monetary value to the internet advertising. Radio stations and television stations use ratings services that assess how many people are listening to a particular radio program or watching a particular television program in order to assign a monetary value to advertising on that particular program. Radio and television programs with more listeners or watchers are assigned larger monetary values for advertising. With Internet banner type advertisements, a similar metric may be used. For example, the metric may be the number of times that a particular Internet banner advertisement is displayed to people browsing various web sites. Each display of an internet advertisement to a web viewer is known as an "impression."

In contrast to traditional mass media, the internet allows for interactivity between the media publisher and the media consumer. Thus, when an internet advertisement is displayed to a web viewer, the internet advertisement may include a link that points to another web site where the web viewer may obtain additional information about the advertised product or service. Thus, a web viewer may 'click' on an internet advertisement and be directed to that web site containing the additional information on the advertised product or service. When a web viewer selects an advertisement, this is known as a 'click through' since the web viewer 'clicks through' the advertisement to see the advertiser's web site.

A click-through clearly has value to the advertiser since an interested web viewer has indicated a desire to see the advertiser's web site. Thus, an entity wishing to advertise on the internet may wish to pay for such click-through events instead of paying for displayed internet advertisements. Internet advertising services have therefore started offering internet advertising on a pay-per-click basis wherein advertisers pay for a certain number of web viewers that click on advertisements.

To maximize the advertising fees that may be charged, internet advertising services must therefore display advertisements that are most likely to capture the interest of the web viewer. Thus, the overall goal is to maximize the probability of having a web viewer click on the advertisement. In order to achieve this goal, it would be desirable to be able to estimate the probability of a web viewer clicking on various different advertisements that may be displayed to the user.

SUMMARY OF THE INVENTION

The present invention introduces methods for generating predictions for events having rare occurrence rates using established taxonomies. In a specific embodiment, the techniques are used for predicting the click-through rates of various different internet advertisement types displayed on various different web page types.

In the system of the present invention, a click-through rate prediction is generating using a hybrid system with two terms. The first term is constructed using a machine learning model that incorporates a limited number of important factors. The second term is constructed using a look-up table that is built using a complex statistical analysis of various web page type and advertisement type combinations. Specifically, the web page type and advertisement type combinations are aggregated at different resolutions and form a multi-level hierarchical structure where combinations at finer resolutions are nested within combinations at coarser resolutions.

To construct the second term, the field of multi-level hierarchical modeling is used. Specifically, a multi-level model is used to process the training data and construct the adjustment factor look-up table. To estimate parameters efficiently and in a scalable fashion, a Kalman filter algorithm is used to estimate the parameters associated with the multi-level model. The complexity of the model is linear in the number of combinations considered and hence makes the method scalable.

Other objects, features, and advantages of present invention will be apparent from the accompanying drawings and from the following detailed description.

BRIEF DESCRIPTION OF THE DRAWINGS

The objects, features, and advantages of the present invention will be apparent to one skilled in the art, in view of the following detailed description in which.

DETAILED DESCRIPTION

Detailed methods for generating predictions of events with rare occurrence rates using taxonomies are disclosed. In the following description, for purposes of explanation, specific nomenclature is set forth to provide a thorough understanding of the present invention. However, it will be apparent to one skilled in the art that these specific details are not required in order to practice the present invention. The present invention is mainly described with reference to a system for generating click-through rates for internet advertisements displayed to a web viewer on the World Wide Web. However, the same techniques can easily be applied to generate predictions of other events with rare occurrence rates provided that there is a hierarchical structure that may be applied to the information.

Advertising Support for Commercial World Wide Web Sites

The World Wide Web portion of the global Internet has become a mass media that largely operates with commercial web sites that are supported by advertising. Specifically, web site publishers provide interesting content that attracts web site viewers and the web site publishers intersperse paid advertisements into the web pages. The fees from the advertisers compensate the web site publisher for the web site hosting and the costs of creating the interesting content that attracts the web viewers.

Some internet web site advertisements are 'banner advertisements' consisting of an advertiser-supplied image or animation. Other internet web site advertisements merely consist of simple short strings of text. However, one thing that most internet web site advertisements have in common is that the internet web site advertisements contain a hyperlink (link) to another web site such that the person viewing the internet advertisement may click on the advertisement to be directed to the advertiser's web site to obtain more information.

Figure 1:
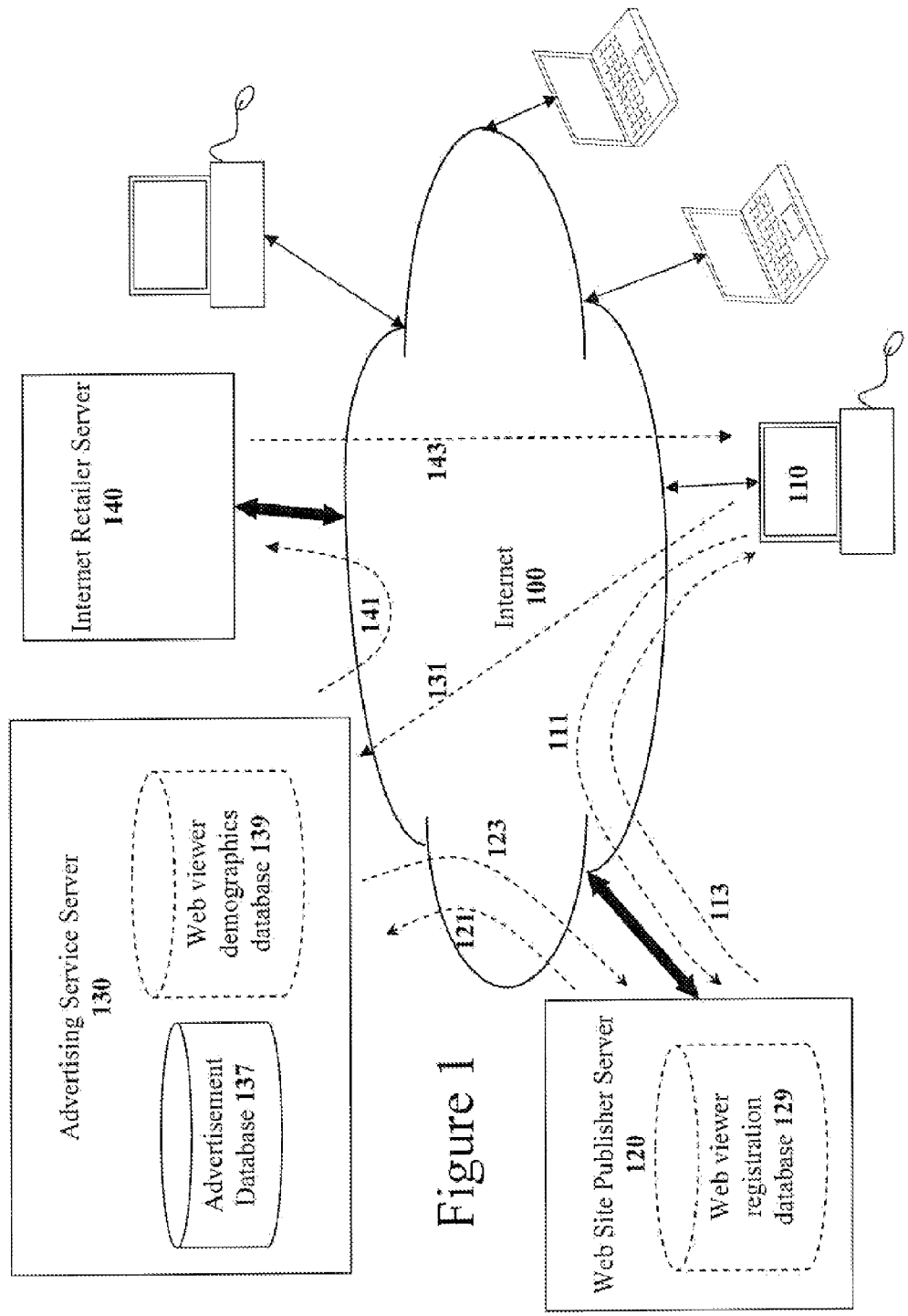
FIG. 1 illustrates a conceptual diagram of a user at a personal computer system accessing a web site server on the Internet that is supported by an advertising service.

The advertisements within an advertisement supported web site are often provided to a commercial web site publisher by an internet advertising service. FIG. 1 illustrates conceptual diagram of how an internet advertising service and a web site publisher operate.

Referring to FIG. 1, an internet based retailer server 140 that sells products to Internet users may wish to seek additional customers. Thus, that Internet based retailer may sign up with an internet advertisement service 130 in order to promote the web site of the internet based retailer. The internet advertisement service will handle the display of internet advertisements by attempting to place the advertisements within web sites that have web viewers who may be interested in the products sold by the internet based retailer.

The web site served by web site publisher server 120 may contain web pages viewed by web viewers interested in the internet retailer's services. Thus, when an internet user at personal computer requests a web page published by web site publisher server 120 (along request communication 111) web site publisher server 120 may subsequently request an advertisement from internet advertisement server 130 (along request 121) and receive an advertisement for the internet retailer (along response 123). The web site publisher server 120 will then deliver the requested web page along with the selected advertisement along response 113 such that the user at personal computer 110 is exposed to an internet advertisement that advertises the offerings of the internet retailer server 140.

If the internet user at personal computer 110 is sufficiently interested in what is presented within the advertisement, the internet user may click on the advertisement such that the user will be re-directed to the internet retailer server 140. The user will be re-directed to the internet retailer server 140 through an advertising service server 130 that will record the user's selection of the advertisement in order to bill the advertiser for the selection of the advertisement. Once the user has been re-directed to the internet retailer server 140, the user at personal computer 110 may purchase goods or services directly from the internet retailer server 140.

Targeting of Internet Advertisements

Referring to the example of FIG. 1, the internet retailer obtains the most benefit from internet advertisements when a customer clicks on the internet advertisement since those web viewers are then visiting the internet retailer's web site 140. Thus, the internet retailer would ideally only like to pay for advertisements when web viewers click on the advertisements. To accommodate this desire, many internet advertising services have begun to offer internet advertising services on such a "pay-per-click" basis.

With a pay-per-click business model, the advertising service 130 needs to carefully select the internet advertisements from the advertisement database 137 that will most likely appeal to the web viewers (and thus be clicked on) in order to maximize the advertising revenue. One method of selecting internet advertisements that may appeal to the web viewers is to examine the contents of the web page that the web viewer selected and attempt to select an advertisement that closely complements the content of the web page selected by the web viewer. Another technique of selecting an internet advertisement is to examine any demographic information known about the web viewer stored and use that information to help select an advertisement for the web viewer. Some simple demographic information such as the user's location may be derived using the web viewer's Internet Protocol (IP) address. Other demographic information may be obtained by user registrations and subsequently accessed from a web viewer demographics database 139 using a browser cookie.) There are many methods of performing such behavioral targeting in order to select advertisements.

Targeting Using Machine Learning

One method of performing such advertisement targeting is to have a machine learning system examine a massive amount of historical information on web viewer demographics, web pages viewed, and the internet advertisements that web viewers did or did not click on. After training upon a large amount of historical web browsing information, the machine learning system could then make click-through rate predictions such that the system could select the advertisement with the highest predicted click-through rate probabilities.

Many well-known artificial intelligence techniques exist for examining historical information (known as training data) in order to make predictions in new situations. Thus, it is possible to employ such artificial intelligence techniques to examine historical web advertisement viewing patterns in order to create a machine learning model that performs these click-through rate predictions. However, in practice it has proven difficult to use such machine learning systems to build prediction models in this web advertisement context.

One difficult aspect is that the amount of training data that needs to be examined is exceedingly vast. A machine learning system could examine all the web page features of viewed pages, all searches performed by web viewers, the geographic location of web viewers as determined by IP address, all the advertisements clicked or not clicked, and large number of other pieces of information known about the web viewers. A machine learning system that would analyze such vast amounts of information would be very difficult to create. Furthermore, once created it would be very difficult to maintain such a system since by the time all of the initial training is complete, the training data may be outdated since web user behavior patterns are constantly changing. And even wish a comprehensive and well-maintained machine learning built model, it is difficult to quickly access the prediction information at run time.

Another problem with a large scale machine learning based advertisement selection system is that the click-rate on web site advertisements is very low. The click-through rate for each web page displayed with an advertisement is generally one percent or less. With such low click through rates, the amount of click-though data is sparse and the collected data tends to be noisy. With such sparse and noisy data, the machine learning models tend to include a large number of features to reduce bias and may end up with extremely complicated black-box type models which are hard to index (and hence make ad retrieval slow). Since machine learning systems attempt to find correlation in the source data, a machine learning built model using such data may draw inaccurate inferences from the noisy data and thus not generalize well.

Thus, even with the aid of advanced machine learning systems, it is difficult to make accurate assessments as to the probability of a web viewer clicking on a particular internet advertisement. In contrast, the present invention proposes a new system that will exploit existing domain knowledge available in the form of hierarchies. Furthermore, with the proposed system a small set of adjustment factors allow for a quick look-up to be performed at run time.

Hybrid System for Making Predictions

To reduce the complexity and improve the performance of a web advertisement click-through prediction system, the present invention introduces a two-part hybrid prediction system. The first part of the hybrid prediction system is a traditional machine learning constructed portion that considers a limited number of important factors. The second part of the hybrid prediction system provides an adjustment based upon the combination of the particular web page type and the particular advertisement type. The 'type' of web page and advertisement are from a defined hierarchical taxonomy.

The two-part hybrid prediction system may be presented in a high level format with the following terms:

s is a (page, ad) pair, a particular point in web page-ad space, $p_s$ is a Click-Through Rate for a particular (page, ad) pair F: $[0,1] \to R$ Maps probability values to the real number space for more flexibility, A common function used is $$\log\left(\frac{p}{1-p}\right)$$

An inverse function can return the value back to a traditional probability value.

$$\eta_s = F(p_s)$$

$$\eta_s = \sum_{i=1}^{K} \beta_i X_i(s) + \varepsilon(s)$$

In the model $$\eta_s = \sum_{i=1}^{K} \beta_i X_i(s) + \varepsilon(s),$$

the first term $$\left(\sum_{i=1}^{K} \beta_i X_i(s)\right)$$

represents a traditional machine learning model that considers K different important factors for making a click-through rate prediction. The K factors may include the web user's geographic location, demographic information known about the web users, and other factors that are considered very important for making a click-through rate prediction. However, the number of factors K is kept limited in order to prevent the machine learning portion of the hybrid system from becoming too slow, complex, and unwieldy.

The second term ($\varepsilon(s)$) of the hybrid system provides an adjustment based upon the combination of a particular web page selected and the particular advertisement selected. Specifically, both the web page and the advertisement are classified using a hierarchical classification system. Then, based up on the specific combination of web page type and advertisement type, an adjustment factor is retrieved from an adjustment factor look-up table and applied. Note that although each (web page type, advertisement type) node combination covers many different pairings web pages and advertisements, the adjustment factor is constant for all. Thus, the total number of adjustment factors that must be generated and maintained equals the number of unique (web page type, advertisement type) node combinations (a number that is in the thousands in one embodiment). This number is much smaller than the (potentially infinite) number of unique web page and advertisement combinations. In this manner, a relatively simple and quick adjustment is made to the machine learning part of the prediction. The alternative would be to have massive amounts of features extracted from the web page & advertisement and then have those features considered as used as data points in the machine learning model.

Creating the Adjustment Factor

As set forth in the previous section, a key aspect of the present invention is the use of an adjustment factor that may be looked up relatively quickly in real-time based upon the type of web page selected and the type of advertisement selected. However, the full details behind how that adjustment factor is calculated are complex. This section will first disclose how the adjustment factor is obtained from a look-up table and applied at run-time. Then, the details on what preparations go into creating the adjustment factor look-up table are disclosed.

Run-Time Adjustment Factor

Figure 2:
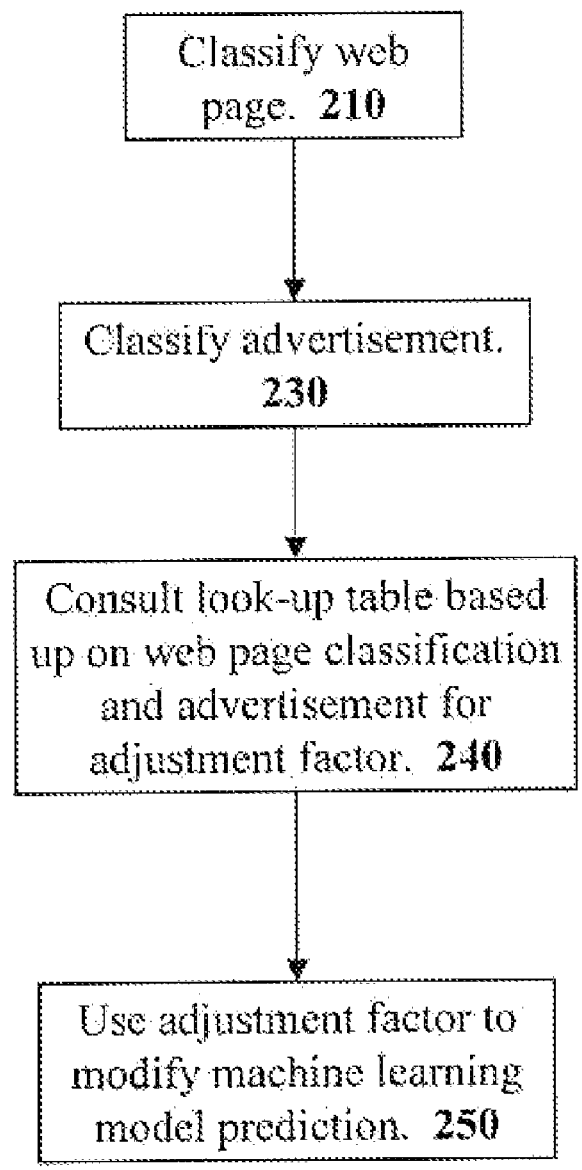
FIG. 2 illustrates a high-level flow diagram describing one embodiment of how an adjustment factor for a click-through rate predictions system may be determined at run-time.

FIG. 2 illustrates a high-level flow diagram describing one embodiment of how the factor adjustment may be obtained and applied at run-time. First, at step 210, the system classifies the web page upon which the advertisement will be displayed. The classification may be done by extracting features from the web page and placing the web page into a hierarchical classification system based upon those features.

Figure 3:
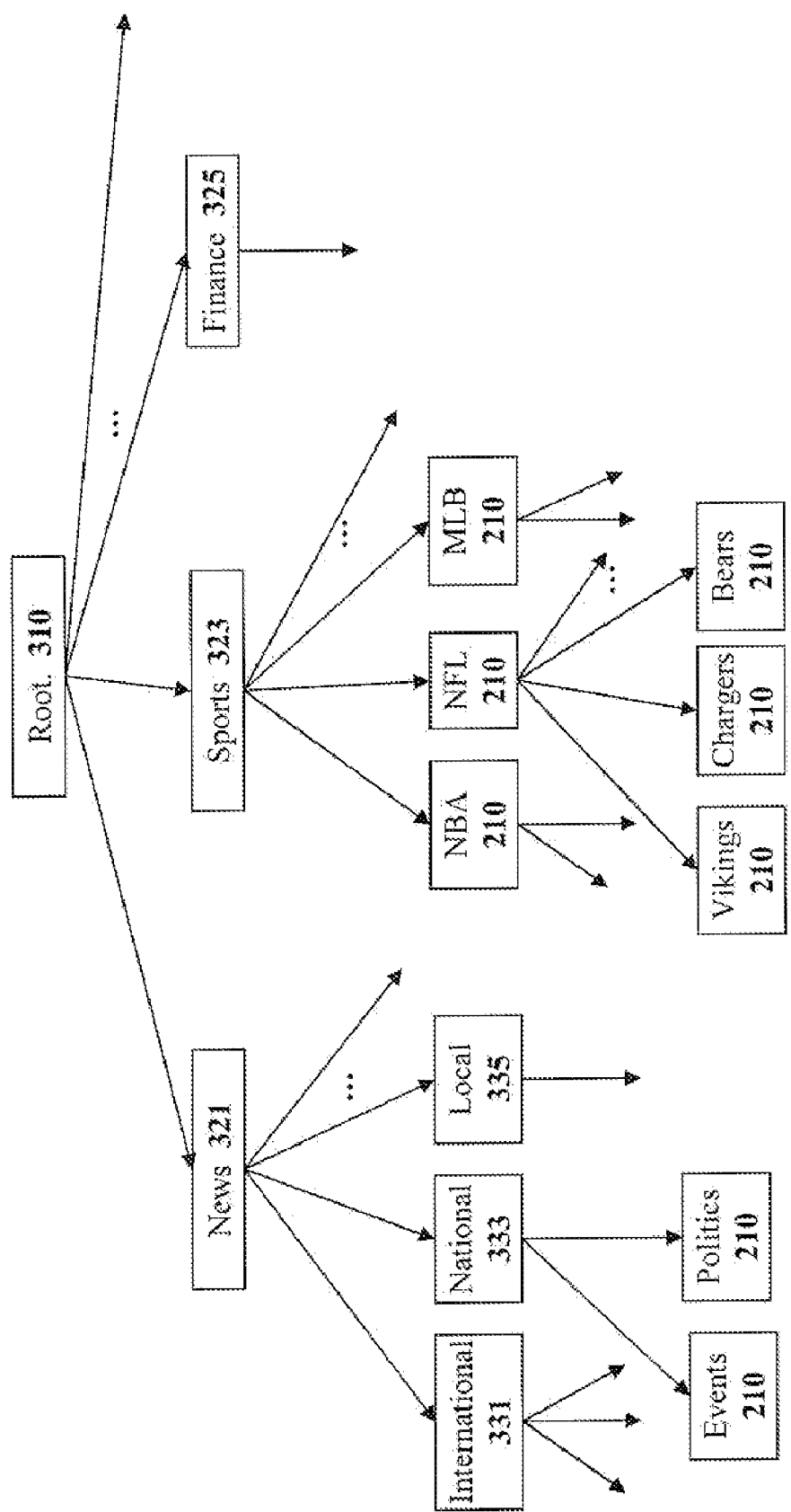
FIG. 3 illustrates one possible embodiment of hierarchical classification system that may be applied to classify web pages.

The hierarchical classification system may classify web pages based upon semantic relevance. In one embodiment, the hierarchical classification system classifies web pages in a manner similar to common newspaper sections. FIG. 3 illustrates a portion of one possible example of hierarchical classification system that may be applied. Ideally, every web page is classified down to a leaf node in the hierarchical classification system. (However, this is not strict requirement.) The hierarchical classification system inherently contains information and structure.

Referring back to FIG. 2, the system next classifies the internet advertisement being considered at step 230. In one embodiment, the same hierarchical classification system is used to classify the advertisements. However, the hierarchical classification system need not be the same for both the web pages and the internet advertisements.

Next, at step 240, the system consults an adjustment factor look-up table based upon the web page classification and the internet advertisement classification. In an embodiment that always classifies the web pages and internet advertisements down to leaf nodes, the adjustment factor look-up table will have a number of entries equal to the number of web page classification leaf nodes times the number of advertisement leaf nodes. Finally, at step 250, adjustment factor obtained from the adjustment factor look-up table is then used to augment the first factor from the machine learning system.

Run-Time Adjustment Factor

As set forth in the previous section, the run-time application of the adjustment factor mainly involves a relatively simple table look-up. However, the creation of that adjustment factor look-up table is quite complex. To create the adjustment factor look-up table, large sources of training data are carefully processed to determine the click-through rates for the various web page type and advertisement type combinations.

As previously set forth, web based advertisement click-through rates generally are very low. The very low click through rates causes the click-through rate data to be noisy. To compound the difficulties, the historical information on web based advertisement click-through events is generally incomplete. Specifically, various web page type and advertisement type pairings may have only very rarely (or never) occurred. And with those web page type and advertisement type pairings that rarely occur, there may not be a single click-through event that ever occurred. This could be incorrectly interpreted as such web page type and advertisement type pairings would never ever lead to a click-through.

To handle these short comings of the click-through training data, the present invention takes advantage of the field of statistics known as multi-level hierarchical modeling. Specifically, a multi-level hierarchical model is used to process the training data and construct the adjustment factor look-up table. The multi-level hierarchical model takes advantage of strong correlations expected to be inherent in structured data after adjusting for important factors from the machine learning part of the two-part hybrid model. The strong correlations allow good predictions to be made even in areas with little or no training data by borrowing information from coarser resolutions in the multi-level structure induced by the taxonomies. Detailed information on multi-level hierarchical statistical modeling can be found in the book "Multilevel Statistical Models" by Harvey Goldstein.

One type of multi-level hierarchical model that has proven useful is tree-structured Markov models. To prove that the tree-structured Markov models would be useful in the present web advertisement application, research was conducted to determine if these correlations existed within combinations of common web page type and advertisement type hierarchical taxonomies. Indeed strong correlations existed. These correlations are documented in the paper "Estimating Rates of Rare Events at Multiple Resolutions" by D. Agarwal, A. Broder, D. Chakrabarti, D. Diklic, V. Josifovski, and M. Sayyadian which is incorporated herein by reference The pioneering research in multi-level hierarchical models entails very complex mathematics that grows exceedingly cumbersome with large data sets. The multi-level hierarchical prediction systems work well in applications with relatively small hierarchies. However, with large hierarchies the computations required quickly grow out of control. Beyond a certain point, the usage of the original hierarchical models developed by the pioneers in the field becomes impractical. One possible method of continuing to use such models would entail chopping off the hierarchies to include only a few nodes in order to keep the computational complexity within a practical range. However, such a tactic would likely degrade the predictive performance of the model.

A related field of work introduced new models created by others that operated using less complex calculations. Specifically, K. C. Chou, A. S. Willsky, and R. Nikourkhah drafted a paper titled "Multiscale Systems, Kalman Filters, and Riccati Equations" published in the IEEE Transactions on Automatic Control, 39:479-492, 1994. The main advantage of these new models over the previous methods is that the new models incorporate a fast recursive Kalman-filter prediction method. H. C. Huang and N. Cressie later applied these Kalman-filters to spatial statistical models in a research paper titled "Multi-scale Graphical Modeling in Space: Applications to Command and Control" published in the Proceedings of the Spatial Statistics Workshop, New York: Springer Lecture Notes in statistics Springer Verlag Publishers, 2000.

In the present invention, these advances of applying Kalman-filters to spatial statistics have been put to use in the field of web advertising to perform computations for multi-level models. Specifically, the multi-level models are expressed as tree-structured Markov models for which the scalable Kalman-filter methods have been applied and have proven very useful. The end result is that the complexity of the calculations is linear in proportion to the total number of end node combinations (the number of web page classification nodes times the number of advertisement classification nodes).

The following section discloses the computational steps that enable the application of multi-level hierarchical models to large scale web-applications through the use of Kalman filters for tree-structured Markov models. Let $y_s$ denote the indicator of observation, (click or no-click) for the $s^{th}$ point in the (web page type, advertisement type) space. The goal is to estimate the $\beta_i$'s, $\epsilon(s)$'s by minimizing some loss $$\sum_s L(y_s, \eta_s);$$

where the symbols have the same meanings as explained in an earlier section. Referring to each (web page type, advertisement type) combination from the respective hierarchies as regions, one can note the following:

a) that each point s is mapped to some region in the (web page type, advertisement type) combination at the finest resolution b) The regions themselves form a hierarchy and every region is nested within one coarser region higher in the hierarchy, c) The adjustment factor is assumed constant for every region. (And in an embodiment that classifies every web page and advertisement down to a leaf node classification, adjustment factors are only required for the regions at the finest resolution.)

If every region at the finest resolution in the entire hierarchy has a large number of data samples s mapped to it (for example, more than 100) then one can obtain accurate estimates of adjustment factors without the use of any multi-level models. However, this is not the case in web-applications where the hierarchies are large and training data coverage in regions are highly non-uniform and sparse.

In order to compensate for the incomplete and non-uniform training data, one needs to estimate adjustment factors at finer resolutions by using information from coarser resolutions. This is precisely what the multi-level models are designed to handle. Specifically, a multi-level model provides a principled way for transmitting the right amount of information from different resolutions to the finest one to get an optimum estimate of adjustment factors. The central idea is the use of "shrinkage" estimation wherein a-priori the adjustments of children nodes are assumed to be drawn from a distribution centered at the adjustment of its parent node with some variance.

Proposed multi-level model can be described with the following equation: $\epsilon(r)=\epsilon(pa(r))+v_r \sim (0, \sigma_r^2)$ where r denotes a region, pa(r) denotes the parent region and $\sigma_r^2$ denotes the spread of the distribution which is to be estimated from the data. To make the problem tractable, the spread of all regions at a given resolution are assumed to be same, i.e., $\sigma_r^2 = \sigma_d^2$; where d is the depth of region r in the region tree. To simplify exposition, one may assume a squared-error loss, i.e. $L(y,\eta) = (y-\eta)^2$. The more appropriate loss which is equivalent to assuming $\eta = \log(p/(1-p))$ is given by the "logistic loss". However, the method for the squared-error could be adapted to logistic by using variational approximations as described in the paper "Bayesian parameter estimation via variational methods" by "T. S. Jaakkola and M. L. Jordan". For the squared error loss, the model is given by the following equations:

$$y_s = \sum_{i=1}^{K} X_i(s)\beta_i + \varepsilon_r(s \in r)$$

$$\varepsilon_r = \varepsilon_{pa(r)} + v_r \sim (0, \sigma_L^2)$$

$$\varepsilon_{pa(r)} = \varepsilon_{gpa(r)} + v_{pa(r)} \sim (0, \theta_{L-1}^2) \ldots$$

and so on until one reaches level 1 in the L level region hierarchy. In words, the adjustment of a region at the finest level L is centered at its parent adjustment with a spread (constant but unknown at each level) which in turn is centered at its parent (i.e. the first region's grandparent) and so on. Most of the traditional methods of estimating parameters in these models combine the recursive equations of adjustment and obtain a single equation which expresses the entire system. Such schemes end up requiring complex matrix factorizations in the estimation process that do not scale well. However, if one treats the estimation problem as consisting of the series of equations, this is exactly similar to the Kalman filter state equations on the epsilons' which are used to describe tree-structured Markov model. The extra machine learning terms and the spread parameters can be estimated by combining the Kalman filter recursions with an Expectation-Maximization algorithm as explained in the paper by "Agarwal et al."

One method of understanding the system is to think of the Kalman filter as a surrogate to perform matrix factorization. The fact that the Kalman filter method can do it with complexity linear in the number of regions shows that the special structure of the problem enables one to reduce the complexity to that of factorizing a highly specialized matrix that has a band structure. However, note that this insight is non-trivial as the actual matrix that results from the equations does not have a band structure. What has been shown is the Markovian structure in the problem provides a scalable computational machinery whose complexity is roughly equivalent to that of a matrix which has band structure. Such insights do not exist in the multi-level hierarchical model literature that use a deterministic optimization approach to estimate parameters are hence not scalable to the problem at hand. An exception is what is known as the Gibbs sampling approach where every iteration updates the estimates of regions in complexity which is comparable to the Kalman filter algorithm. However, Gibbs sampling is not a deterministic optimization procedure, it is a stochastic optimization procedure requiring considerably large number of iterations, storage, and book-keeping. Moreover, there are no automatic ways to assess convergence making it almost infeasible to apply in the current setting.

The foregoing has described a number of techniques for generating predictions of events with rare occurrence rates using taxonomies. The techniques have been disclosed within the context of predicting click-through rates for internet advertisements displayed on web pages, although the general teachings are applicable in many other situations It is contemplated that changes and modifications may be made by one of ordinary skill in the art, to the materials and arrangements of elements of the present invention without departing from the scope of the invention.

I claim:

1. A computer implemented hybrid method of predicting click-through rates, said method comprising:
   creating a machine learning based model, said machine learning model constructed using training data having a first set of features;
   creating a tree-structured statistical table from a second set of features in training data by applying Kalman-filter methods to a tree-structured Markov model to estimate parameters in said tree-structured statistical table;
   executing said machine learning model using said first set of features from test data; and
   adding to augment the base prediction of the executed machine learning model by an adjustment factor obtained from said tree-structured statistical table using said second set of features from said test data to predict click-through-rates.

2. The hybrid method of predicting click-through rates as set forth in claim 1 wherein said machine learning based model considers a limited important set of global features.

3. The hybrid method of predicting click-through rates as set forth in claim 1 wherein said second set of features comprises text from web pages.

4. The method of predicting click-through rates as set forth in claim 1 wherein adding an adjustment factor using said second set of features from said test data comprises:
   making a classification decision based up on said second set of features; and
   indexing into said tree-structured statistical table using said classification.

5. The method of predicting click-through rates as set forth in claim 4 wherein making a classification decision comprises making a web page classification and making an advertisement classification.

6. A hybrid prediction computer system for processing training data to predict click-through-rates, said hybrid prediction computer system processing training data by:
   creating a machine learning based model for making a base prediction, said machine learning model constructed using a first set of features in training data;
   creating a tree-structured statistical table from a second set of features in training data by applying Kalman-filter methods to a tree-structured Markov model to estimate parameters in said tree-structured statistical table;
   executing said machine learning model using said first set of features from test data; and
   adding an adjustment factor from said tree-structured statistical table to augment said base prediction from said machine learning based model to predict click-through-rates.

7. The hybrid prediction computer system as set forth in claim 6 wherein said machine learning based model considers a limited important set of global features.

8. The hybrid prediction computer system as set forth in claim 6 wherein said second set of features comprises text from web pages.

9. The hybrid prediction computer system as set forth in claim 6 wherein obtaining an adjustment factor for said tree-structured statistical table comprises:
   making a classification decision based up on said second set of features; and
   indexing into said tree-structured statistical table using said classification.

10. The hybrid prediction computer system as set forth in claim 9 wherein making a classification decision comprises making a web page classification and making an advertisement classification.

11. A computer-readable medium, said computer-readable comprising a set of computer instructions for implementing a hybrid method of predicting click-through rates, said computer instructions performing the steps of:
   creating a machine learning based model, said machine learning model constructed using training data having a first set of features;
   creating a tree-structured statistical table from a second set of features in training data by applying Kalman-filter methods to a tree-structured Markov model to estimate parameters in said tree-structured statistical table;
   executing said machine learning model using said first set of features from test data; and
   adding to augment the base prediction of the executed machine learning model by an adjustment factor obtained from said tree-structured statistical table using said second set of features from said test data to predict click-through-rates.

12. The computer-readable medium as set forth in claim 11 wherein said machine learning based model considers a limited important set of global features.

13. The computer-readable medium as set forth in claim 11 wherein said second set of features comprises text from web pages.

* * * * *